United States Patent
Wang et al.

(10) Patent No.: US 7,831,000 B2
(45) Date of Patent: Nov. 9, 2010

(54) METHOD FOR TIME SYNCHRONIZATION IN DISTRIBUTED CONTROL SYSTEM

(75) Inventors: Si-Hai Wang, Suwon-si (KR); Jae-Hun Cho, Seoul (KR); Seong-Taek Hwang, Pyeongtaek-si (KR); Hoon Kim, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 960 days.

(21) Appl. No.: 11/652,226

(22) Filed: Jan. 11, 2007

(65) Prior Publication Data

US 2007/0258550 A1    Nov. 8, 2007

(30) Foreign Application Priority Data

May 2, 2006    (KR)    .................. 10-2006-0039606

(51) Int. Cl.
*H04L 7/00*    (2006.01)

(52) U.S. Cl. ...................................... 375/354; 375/355
(58) Field of Classification Search ................. 375/354, 375/355
See application file for complete search history.

(56) References Cited

U.S. PATENT DOCUMENTS

| 2005/0180466 A1 | 8/2005 | Franchuk et al. | |
| 2007/0258550 A1* | 11/2007 | Wang et al. | 375/354 |
| 2009/0034672 A1* | 2/2009 | Cho et al. | 375/364 |
| 2009/0168808 A1* | 7/2009 | Cho et al. | 370/503 |

FOREIGN PATENT DOCUMENTS

| EP | 0991216 | 4/2000 |
| EP | 1324520 | 7/2003 |
| JP | 09-319407 | 12/1997 |

OTHER PUBLICATIONS

Puneet Sharma, "IEEE 1588 in Network Processors for Next-Generation Industrial Automation Solutions" Technology@Intel Magazine, Intel Corporation, 2005.*

Sihai Wang, Jaehun Cho, Geoffrey M. Garner, "Improvements to Boundary Clock Based Time Synchronization through Cascaded Switches," 2006 Conference on IEEE 1588 Standard or a Precision Clock Synchronization Protocol for Networked Measurement and Control Systems, National Institute of Standards and Technology,Gaithersburg, Maryland, USA, Oct. 2-4.*

(Continued)

*Primary Examiner*—David C Payne
*Assistant Examiner*—Nader Bolourchi
(74) *Attorney, Agent, or Firm*—Cha & Reiter, LLC

(57) ABSTRACT

A method for time synchronization in a distributed control system includes the steps of: when a sync is received from a master-side, confirming both a reception time point of the corresponding sync and a compensation time point of a previous frequency, and determining if a result obtained by confirming the two time points corresponds to a preset Frequency Compensation Interval (FCI); performing only a time offset compensation operation when the result obtained by confirming the two time points does not correspond to the preset FCI; and performing both time offset and frequency compensation operations when the result obtained by confirming the two time points corresponds to the preset FCI.

3 Claims, 5 Drawing Sheets

OTHER PUBLICATIONS

Sivaram Balasubramanian, Kendal R. Harris and Anatoly Moldovansky, "A Frequency Compensated Clock for Precision Synchronization using IEEE 1588 Protocol and its Application to Ethernet," Rockwell Automation. Sep. 24, 2003. http://ieee1588.nist.gov/z_RA_1_FreqCompClk.pdf.*

Michael Johas Teener et al.;"Precise Timing in a Residential Ethernet Environment;" Broadcom.; Oct. 12, 2005. 39 pages.

The Institute of Electrical and Electronics Engineers, Inc. "IEEE Standard for a Precision Clock Synchronization Protocol for Networked Measurement and Control Systems." Nov. 8, 2002. 144 pages.

* cited by examiner

METHOD FOR TIME SYNCHRONIZATION IN DISTRIBUTED CONTROL SYSTEM

CLAIM OF PRIORITY

This application claims priority to an application entitled "Method For Time Synchronization In Distributed Control System," filed in the Korean Intellectual Property Office on May 2, 2006 and assigned Serial No. 2006-39606, the contents of which are hereby incorporated by reference.

BACKGROUND OF THE INVENTION

1. Field of the Invention

The present invention relates to a method for providing time synchronization in a distributed control system.

2. Description of the Related Art

In general, a distributed control system includes a set of nodes interconnected through one or multiple network communication links. The network communication links may include a packetized link, such as an Ethernet, or one or more of various packetized links, which can be employed in a distributed control system application. In the distributed control systems, there is a recently growing awareness of the need to support time sensitive traffic. Hence, it is necessary to synchronize a clock between nodes of a distributed control system.

In a distributed control system including a plurality of clocks, time synchronization must be employed in order to reduce instabilities inherent in source oscillators and time drift effect in use environment conditions (refers to reference 1 below). Especially, a residential bridge, referred as a residential Ethernet, is considering time synchronization in order to provide traffic streaming, sampling of data streams in source and destination devices, and synchronized clocks for indication of such streams (refers to reference 2 below). In order to perform a precise time synchronization, the distributed control system must have synchronization performance in which a slave clock can be locked to a master clock in both clock time and a clock frequency.

Referring to reference [3] below, an IEEE 1588 standard prescribes time formats and defines a plurality of messages that can be used to distribute timing information, but does not define a scheme for achieving time synchronization. Reference [1] discloses a frequency compensation clock that can perform precise frequency and time synchronizations using an IEEE 1588 protocol, in order to change timing information.

FIG. 1 is a ladder diagram illustrating a basic operation procedure for time synchronization in a general distributed control system, which discloses a basic operation between a master clock and a slave clock in a distributed control system according to the IEEE 1588 protocol. Referring to FIG. 1, the master clock periodically transmits a synchronization message (sync) including its own lunching time to the slave clock, thereby performing an operation for time synchronization at regular intervals. The master clock can transmit opening time through an optional message (follow-up) in a similar manner. A delay request (not shown) is transmitted from the slave clock to the master clock in order to confirm the transmission delay, and a delay response (not shown) is transmitted from the master clock to the slave clock in response to the delay request, so that information for confirming the transmission delay time can be obtained.

Through detection of arrival time of such a sync, reception of launching time within the sync, and subtraction of transmission delay time from the master clock to the slave clock, the slave clock recognizes its own time offset related to the master clock, and thus compensates for its own operation frequency and time values. Reference [3] discloses a detailed procedure for the IEEE 1588 protocol.

FIG. 2 is a block diagram illustrating a main part of a frequency compensation clock in a general distributed control system, which has the same construction as disclosed in the reference [1]. Referring to FIG. 2, the frequency compensation clock includes a frequency compensation module 210 and a clock counter 220. As indicated in more detail by the dotted lines of FIG. 2, the frequency compensation module 210 may include a frequency multiplier 214 and a frequency compensation value register 212. Before a local oscillator frequency is provided to the clock counter 220, it is multiplied to a frequency compensation value in the frequency compensation module 210, and thus the frequency is corrected. As disclosed in reference [1], clocks with this construction can compensate for both a time offset and a frequency by properly updating a frequency.

In the slave clock, an initial value of the frequency compensation value may be scheme-dependent. In a clock setup environment of FIG. 2, a frequency compensation value may be set to 1, differently from reference [1], but which neither has an effect on an operation process nor leads to another result.

Hereinafter, the frequency update scheme will be described in more detail with reference to FIG. 1 and is performed as follows. As illustrated in FIG. 1, at MasterSyncTime$_n$, the master transmits a sync to the slave. Herein, the corresponding sync includes the time value MasterSyncTime$_n$ by the time-stamping. Herein, the 'n' corresponds to a count value of the sync. The slave receives the sync when its own local clock is SlaveClockTime$_n$. Herein, the slave computes master clock time MasterClockTime$_n$ as expressed by an equation below.

MasterClockTime$_n$=MasterSyncTime$_n$+MasterToSlaveDelay

In the equation above, the MaterToSlaveDelay corresponds to a transmission delay time value.

A master clock count MasterClockCount$_n$ of a current synchronization cycle is determined as expressed by an equation below.

MasterClockCount$_n$=MasterClockTime$_n$−MasterClockTime$_{n-1}$

A slave clock count SlaveClockCount$_n$ for the current synchronization cycle is determined as expressed by an equation below.

SlaveClockCount$_n$=SlaveClockTime$_n$−SlaveClockTime$_{n-1}$

Difference between the master and slave clock counts for the current synchronization cycle, ClockDiffCount$_n$ is determined as expressed by an equation below.

ClockDiffCount$_n$=MasterClockTime$_n$−SlaveClockTime$_n$

The frequency scaling factor of the slave clock, FreqScaleFactor$_n$ is determined as expressed by an equation below.

FreqScaleFactor$_n$=(MasterClockCount$_n$+ClockDiffCount$_n$)/SlaveClockCount$_n$ Then, the frequency compensation value of the current slave clock, FreqCompVlaue$_n$ is computed as expressed by equation 1 below.

FreqCompValue$_n$=FreqScaleFactor$_n$*FreqCompValue$_{n-1}$     (1)

The theoretical result of performing an operation according to the same manner is that at SlaveClockTime$_{n+1}$, the frequencies of master and slave clocks would lock, and the difference ClockDiffCount$_{n+1}$ between the two clocks would be zero.

The manner as described above is used in current frequency compensation clocks compensating for both the frequency and the time offset. Herein, the process for computing the frequency scaling factor is a key point in the manner.

Meanwhile, in the manner for computing the frequency scaling factor as expressed in equation 1, it can be understood that periodical frequency and time offset are periodically and simultaneously compensated using the sync in each reception cycle of the sync. However, if multiple communication networks are hierarchically connected through bridges (switches) by using such a manner as disclosed in reference [4] below, the number of bridges passed by along synchronization paths from a grand master to each slave increases. Therefore, synchronization errors are accumulated when the bridges are passed by through and may exponentially increase.

SUMMARY OF THE INVENTION

Accordingly, the present invention has been made to solve the above-mentioned problems occurring in the prior art and provides additional advantages, by providing a method for time synchronization, which can improve the synchronization performance by considerably reducing a synchronization error in a distributed control system.

In accordance with one aspect of the present invention, there is provided a method for time synchronization in a distributed control system, the method including the steps of: when a sync is received from a master-side, confirming both a reception time point of the corresponding sync and a compensation time point of a previous frequency, and determining if a result obtained by confirming the two time points corresponds to a preset Frequency Compensation Interval (FCI); performing only a time offset compensation operation when the result obtained by confirming the two time points does not correspond to the preset FCI; and performing both time offset and frequency compensation operations when the result obtained by confirming the two time points corresponds to the preset FCI.

Preferably, in the step of determining if the result corresponds to the preset FCI, when the received sync is a sync in a preset sequence from a simultaneous compensation time point of previous time offset and the frequency, it is regarded that the result corresponds to the preset FCI.

BRIEF DESCRIPTION OF THE DRAWINGS

The above features and advantages of the present invention will be more apparent from the following detailed description taken in conjunction with the accompanying drawings, in which.

DETAILED DESCRIPTION

An exemplary embodiment of the present invention will be described in detail herein below with reference to the accompanying drawings. In the below description, many particular items, such as detailed elements, are shown, but these are provided for helping the general understanding of the present invention, it will be understood by those skilled in the art that such particular items can be modified without departing from the scope and spirit of the present invention.

Figure 1:
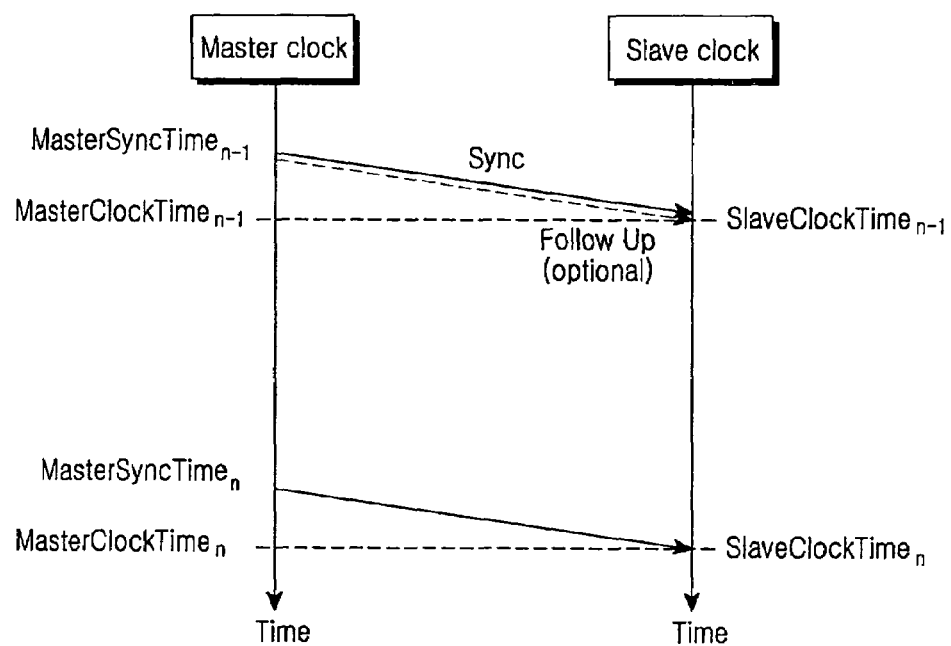
FIG. 1 is a ladder diagram illustrating a basic operation for time synchronization in a general distributed control system.
Figure 2:
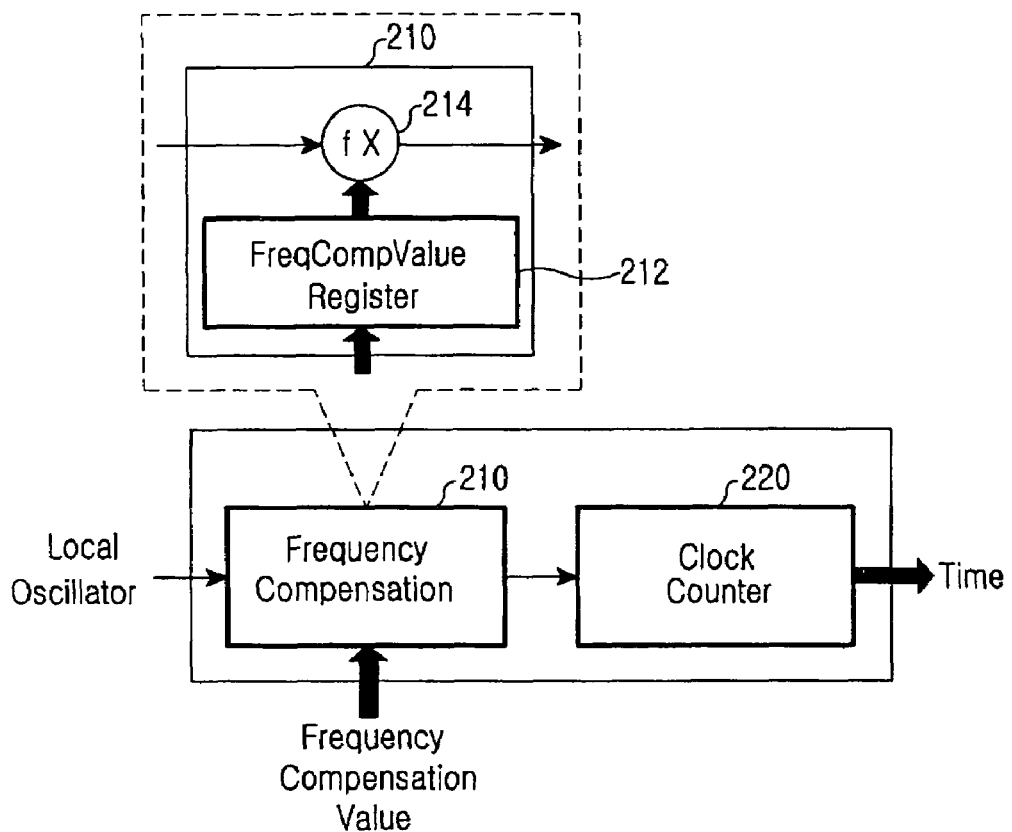
FIG. 2 is a block diagram illustrating a main part of a frequency compensation clock in a general distributed control system.
Figure 3:
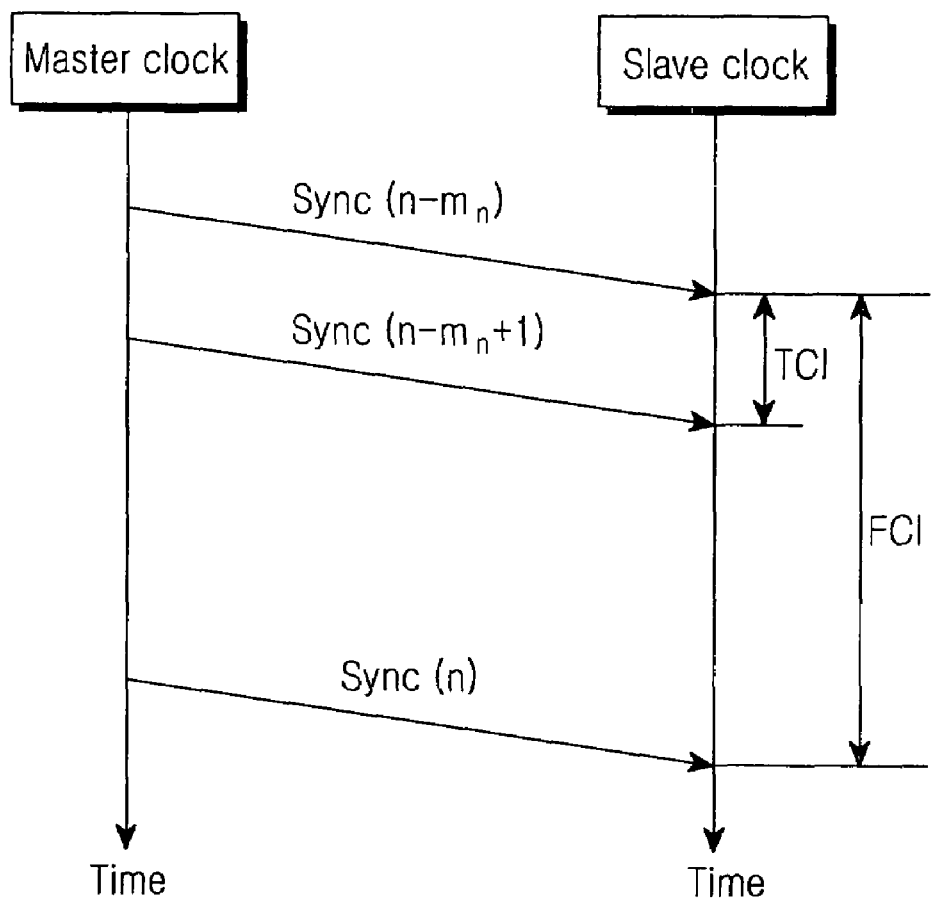
FIG. 3 is a flow diagram illustrating a basic operation for showing a TCI and a FCI for time synchronization in a distributed control system according to one embodiment of the present invention.

FIG. 3 is a flow diagram illustrating a basic operation for showing a Time offset Compensation Interval (TCI) and a Frequency Compensation Interval (FCI) for time synchronization in a distributed control system according to one embodiment of the present invention. Referring to FIG. 3, in a time synchronization scheme according to the embodiment of the present invention, a master clock periodically transmits a sync including its own launching time to a slave clock, thereby performing an operation for time synchronization at regular intervals. Herein, the present invention uses a basic procedure of an IEEE 1588 including communication of a sync, a follow-up, a delay request, and a delay response. However, a frequency update scheme in a slave clock according to the present invention separately compensates for a time offset and a frequency, differently from a conventional scheme of simultaneously compensating for both a time offset and a frequency.

In the present invention, there exists two intervals, e.g. the TCI and the FCI according to synchronization cycles, and time offset compensation and frequency compensation operations are performed according to the period of a corresponding interval. The TCI corresponds to an interval between two adjacent syncs. Further, the FCI is longer than the TCI, e.g. it may be set as a plurality of TCIs.

The definitions of both the TCI and the FCI are illustrated in FIG. 3. In FIG. 3, parameter 'm' is the ratio of the TCI with respect to the FCI. The parameter 'm' may also be set to be time sensitive, and this may be preset in a simpler manner or preset as a properly fixed value in an actual application.

The present invention provides a manner for computing two frequency scaling factors as an operation procedure for a slave clock, according to the two intervals the TCI and the FCI, as described above.

1. TCI

In most case, once a slave receives a sync, the salve uses the received sync to updates its own frequency only for time offset compensation by using a frequency scaling factor calculation scheme as expressed by equation 2.

$$\text{FreqScaleFactor}_n = \text{MasterClockCount}_n / \text{SlaveClockCount}_n \quad (2)$$

2. FCI

According to the characteristic of present invention, when an $n^{th}$ sync (current sync) received from a simultaneous compensation time point of previous frequency and time offset is an $m_n^{th}$ sync, the slave updates its own frequency in order to compensate for both a time offset and a frequency by using the frequency scaling factor calculation scheme, as expressed by equation 3.

$$FreqScaleFactor_n = \qquad (3)$$

$$\frac{\sum_{i=n-m_n+1}^{n} MasterClockCount_i}{\sum_{i=n-m_n+1}^{n} SlaveClockCount_i} + \frac{ClockDiffCount_n}{SlaveClockCount_n}$$

If 'm' is a preset constant and time-insensitive, equation 3 may be expressed by equation 4 below.

$$FreqScaleFactor_n = \frac{\sum_{i=n-m+1}^{n} MasterClockCount_i}{\sum_{i=n-m+1}^{n} SlaveClockCount_i} + \frac{ClockDiffCount_n}{SlaveClockCount_n} \qquad (4)$$

All parameters in equations 2 to 4 have the same definitions as those described in the prior art.

Figure 4:
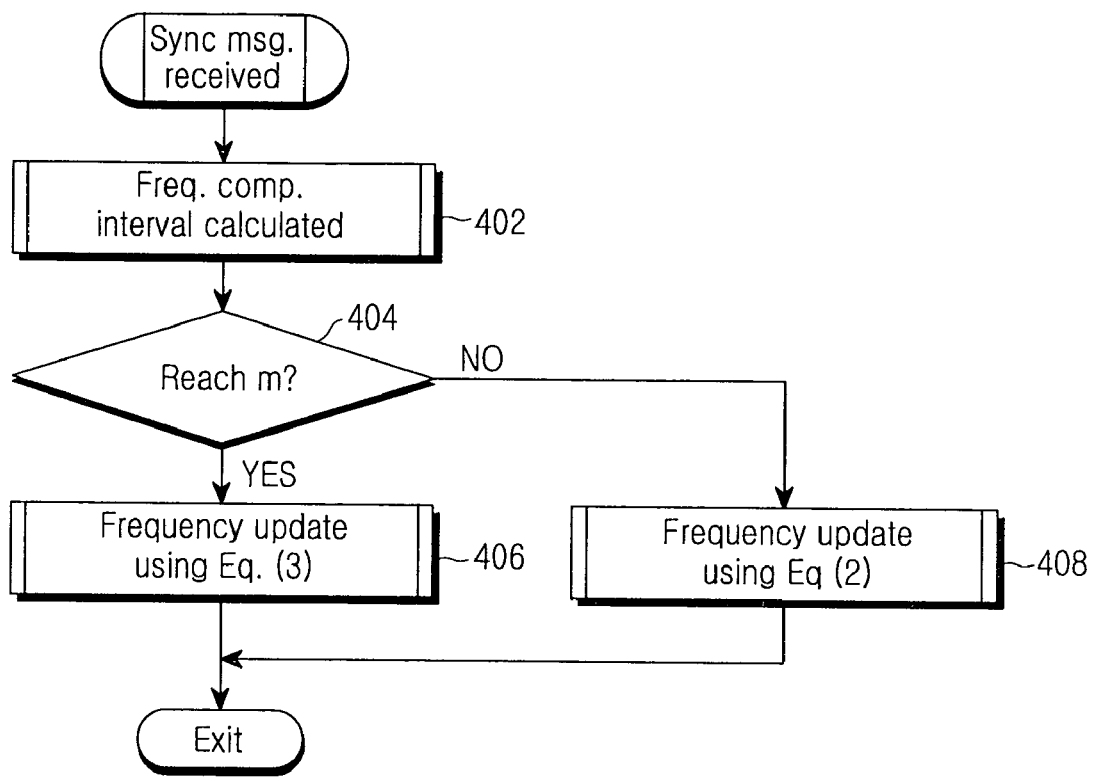
FIG. 4 is an operational flow diagram illustrating time synchronization in the slave of a distributed control system according to one embodiment of the present invention.

FIG. 4 is a flow diagram illustrating the time synchronization operation in the slave of the distributed control system according to one embodiment of the present invention. Referring to FIG. 4, if the slave receives the sync, the slave first computes the FCI according to the reception time point of the corresponding sync in step 402. In step 404, the slave determines if the computed FCI corresponds to a preset FCI. That is, the slave determines if the current received sync is an $m^{th}$ sync from a simultaneous compensation time point of previous frequency and time offset.

If the computed FCI corresponds to the preset FCI as a result of the determination in step 404, the slave updates its own frequency in order to compensate for both the time offset and the frequency using the scaling factor calculation scheme according to equation 3, in step 406. However, if the FCI does not correspond to the preset FCI as a result of the determination in step 404, the slave updates its own frequency in order to compensate only for time offset by using the scaling factor calculation scheme as expressed by equation 2, in step 408.

Figure 5:
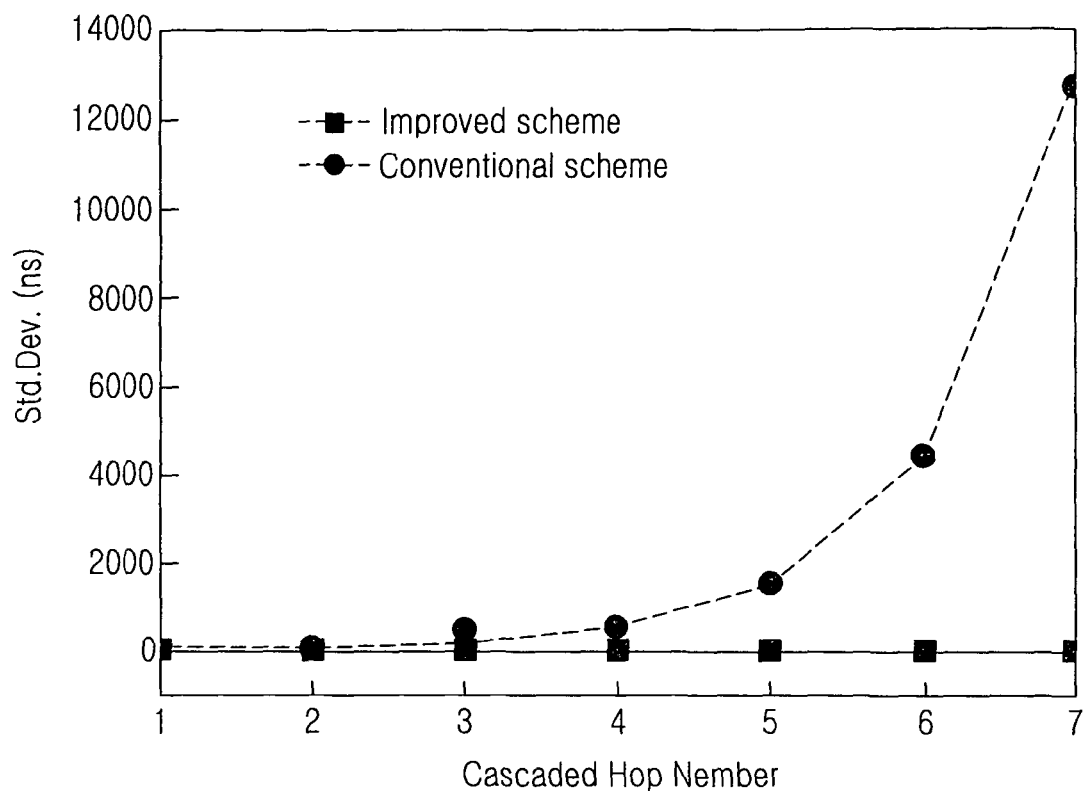
FIG. 5 is a graph illustrating a comparison between time synchronization performance according to the present invention and general time synchronization performance.

FIG. 5 is a graph illustrating a comparison between time synchronization performance according to the present invention and prior art time synchronization performance, which illustrates the simulation results obtained by comparing the conventional scheme with the scheme of the present invention. The simulated system corresponds to a chain of eight nodes indexed 0 to 7. A node 0 is a grand master, and a node i is a master of a node (i+1). Time is hierarchically synchronized hop-by-hop from the node 0 to the node 7. The grand master has a precise oscillator frequency of a 25 MHz. Oscillator frequencies in other nodes are optionally selected within the range of 25 MHz±50 ppm.

Synchronization interval time is one seconds in case of using the conventional scheme. If the scheme of the present invention is used, the TCI is ⅛ second and the FCI is one second. This represents that m is preset and fixed to eight. Each node outputs a pulse indicator every one second. The pulse referred as a first indicator is used for the synchronization performance test herein.

The difference of the first indicator output time between the grand master (node 0) and each slave (nodes 1 to 7) is monitored and recorded for statistical analysis. The last time of the simulation is 3000 seconds in order to eliminate an unexpected error.

According to the simulation results under the these conditions, a standard deviation analyzed for dispersion difference of the first indicator is expressed on a vertical axis in the graph of FIG. 5, and the hop number is expressed on a horizontal axis therein. Referring to FIG. 5, when the conventional synchronization scheme is used, synchronization errors exponentially increase as the hierarchical hop number increases as expressed by the dotted lines in the graph. However, when the scheme of the present invention is used, the expression curve of synchronization errors has a very small slope as expressed by solid lines in the graph. As described above, it can be understood that synchronization performance through hierarchical bridges (switches) is considerably improved when the frequency update scheme of the present invention is used.

A time synchronization scheme in a distributed control system, according to the present invention, separately compensates for the frequency and the time offset of a slave by using technique of separately compensating for the frequency and the time offset, thereby compensating for most errors accumulated along synchronization paths from a grand master to the slave in a network having hierarchical bridges (switches).

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

REFERENCES

[1] S. Balasubramanian, K. R. Harris and A. Moldovansky, "A Frequency Compensated Clock for Precision Synchronization Using IEEE 1588 Protocol and its Application to Ethernet", Proceedings of the Workshop on IEEE 1588, Gaithersburg, U.S., 24 Sep. 2003

[2] M. J. Teener, F. F. Feng, and E. H. Ryu, "Precise timing in a residential Ethernet environment", presented at Proc. of the Workshop on IEEE 1588, Winterthur, Switzerland, 2005.

[3] IEEE, "IEEE standard for a precision clock synchronization protocol for networked measurement and control systems", ANSI/IEEE Std 1588-2002.

[4] S. Wang, J. Cho, Y. Joo, et. al., "Improvements to Boundary Clock Based Time Synchronization through Cascaded Switches", IEEE Transaction on Consumer Electronics, submitted.

What is claimed is:

1. A method for time synchronization in a slave-side of a distributed control system, the method comprising the steps of:

when a sync is received from a master-side, confirming both a reception time point of the corresponding sync and a compensation time point of a previous frequency, and determining if a result obtained by confirming the two time points corresponds to a preset Frequency Compensation Interval (FCI);

performing only a time offset compensation operation when the result obtained by confirming the two time points does not correspond to the preset FCI; and performing both time offset and frequency compensation operations when the result obtained by confirming the two time points corresponds to the preset FCI, wherein, when the received sync is a sync in a preset sequence from a simultaneous compensation time point of previous time offset and the frequency, the result corresponds to the preset FCI.

2. A method for time synchronization in a slave-side of a distributed control system, the method comprising:

a first step of, when a sync is received from a master-side, determining if the received sync is a sync in a preset sequence from a simultaneous compensation time point of previous time offset and frequency;

a second step of updating by the slave-side its own frequency by using the received sync for time offset compensation when a preset FCI is not reached; and a third step of updating by the slave-side its own frequency by using the received sync and a previous received sync for time offset compensation and frequency compensation when the preset FCI is reached, wherein, in the second step of updating by the slave-side its own frequency, a frequency scaling factor 'FreqScalFactor' is computed using an equation below according to an IEEE 1588 protocol, and a frequency compensation value for updating the frequency is computed using the computed frequency scaling factor:

$FreqScalFactor_n = MasterClockCount_n/SlaveClockCount_n$.

3. A method for time synchronization in a slave-side of a distributed control system, the method comprising:

a first step of, when a sync is received from a master-side, determining if the received sync is a sync in a preset sequence from a simultaneous compensation time point of previous time offset and frequency;

a second step of updating by the slave-side its own frequency by using the received sync for time offset compensation when a preset FCI is not reached; and a third step of updating by the slave-side its own frequency by using the received sync and a previous received sync for time offset compensation and frequency compensation when the preset FCI is reached, wherein in the third step of updating by the slave-side its own frequency, a frequency scaling factor 'FreqScalFactor' is computed using an equation below according to the IEEE 1588 protocol, and a frequency compensation value for updating the frequency is computed using the computed frequency scaling factor:

$$FreqScaleFactor_n = \frac{\sum_{i=n-m_n+1}^{n} MasterClockCount_i}{\sum_{i=n-m_n+1}^{n} SlaveClockCount_i} + \frac{ClockDiffCount_n}{SlaveClockCount_n}.$$

* * * * *